United States Patent
Van Den Berg et al.

(10) Patent No.: US 6,787,027 B1
(45) Date of Patent: Sep. 7, 2004

(54) BREAKING OF OIL/WATER EMULSION

(75) Inventors: Franciscus Gondulfus Antonius Van Den Berg, Amsterdam (NL); Arie Jansen, Amsterdam (NL); Paulus Antoon Stamps, Amsterdam (NL)

(73) Assignee: Shell Oil Company, Houston, TX (US)

( * ) Notice: Subject to any disclaimer, the term of this patent is extended or adjusted under 35 U.S.C. 154(b) by 168 days.

(21) Appl. No.: 10/031,753

(22) PCT Filed: Jul. 25, 2000

(86) PCT No.: PCT/EP00/07174

§ 371 (c)(1),
(2), (4) Date: Jan. 21, 2002

(87) PCT Pub. No.: WO01/07139

PCT Pub. Date: Feb. 1, 2001

(30) Foreign Application Priority Data

Jul. 26, 1999 (EP) .............................. 99305908

(51) Int. Cl.⁷ .............................. C10G 33/00; C01B 3/24
(52) U.S. Cl. ..................... 208/187; 423/650; 516/194; 516/196
(58) Field of Search ..................... 208/187; 423/650; 516/194, 196

(56) References Cited

U.S. PATENT DOCUMENTS

| | | | | |
|---|---|---|---|---|
| 1,004,219 A | * | 9/1911 | Travers | 516/196 |
| 1,833,618 A | * | 11/1931 | Pew, Jr. | 516/194 |
| 3,796,652 A | * | 3/1974 | Lupul | 208/39 |
| 3,878,090 A | * | 4/1975 | Redford | 208/188 |
| 4,514,305 A | * | 4/1985 | Filby | 210/703 |
| 5,441,548 A | | 8/1995 | Brandl et al. | |
| 5,882,506 A | | 3/1999 | Ohsol et al. | |
| 5,919,353 A | * | 7/1999 | Itou et al. | 208/188 |
| 5,948,242 A | * | 9/1999 | Ohsol et al. | 208/181 |
| 6,033,448 A | * | 3/2000 | Iijima et al. | 48/211 |
| 6,372,123 B1 | * | 4/2002 | Kresnyak et al. | 208/187 |

FOREIGN PATENT DOCUMENTS

| EP | 0 790 292 A | 8/1997 | ............. C10L/3/00 |
|---|---|---|---|
| WO | 95 34522 A | 12/1995 | ............. C07C/7/00 |

\* cited by examiner

Primary Examiner—Walter D. Griffin
(74) Attorney, Agent, or Firm—Charles Stewart

(57) ABSTRACT

Process for separating an emulsion of a bituminous oil and water into a liquid water phase and a liquid bituminous oil phase, wherein the following steps are performed: (a) raising the temperature of the bituminous oil/water emulsion having a temperature of below 100 ° C. to a temperature of above 140 ° C., and (b) performing a phase separation wherein a water phase and oil phase is obtained, wherein the heating of the emulsion in step (a) is effected by first mixing part of oil phase obtained in step (b) having a temperature of above 140 ° C. with the bituminous oil/water emulsion and subsequently raising the temperature of the resulting mixture to a temperature of above 140 ° C. by making use of indirect heat exchange means.

35 Claims, 1 Drawing Sheet

BREAKING OF OIL/WATER EMULSION

Figure 1:
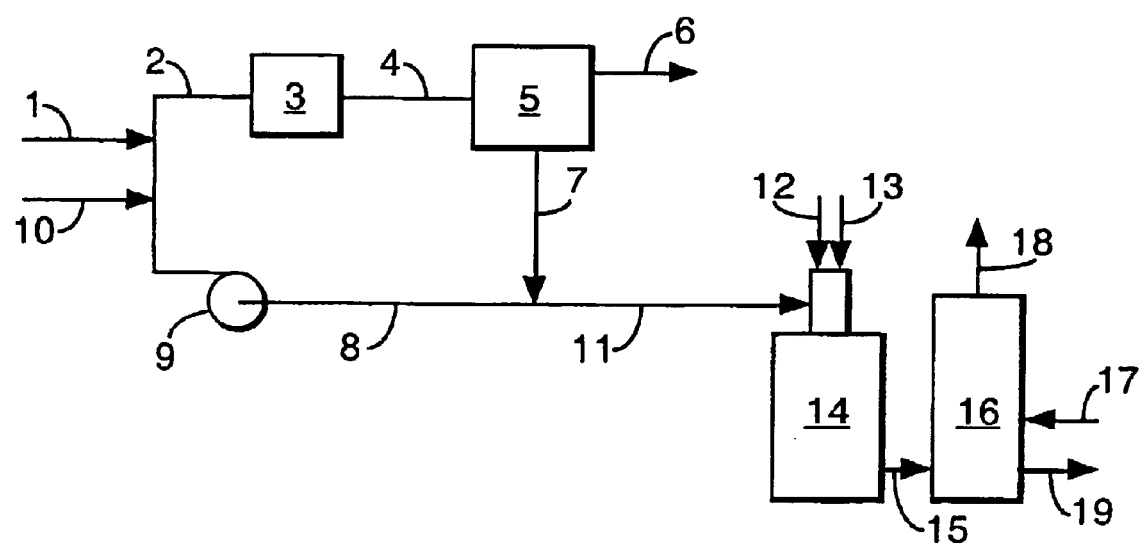

The invention is related to a process for breaking an emulsion of bituminous oil and water into the respective bituminous oil and water phases.

In the Orinoco Basin, in Trinidad, in North America, and in other areas, deposits of heavy oil and asphalt occur which are noted for their high bitumen content. These natural substances—which resemble oil and are commonly known as bituminous oil—can only be extracted by processes reducing viscosity and not by standard refinery methods. The extraction method currently used in the Orinoco Basin comprises emulsification of the bituminous oil at bed level, extraction of the emulsion, upgrading and transport.

Emulsifying the bituminous oils with water brings about a considerable reduction in the viscosity of these oils. The original viscosity in excess of 300 Pa.s at 20° C. is reduced to the range of 12 to 35 Pa.s as a consequence of emulsification. It is only this viscosity-reducing process that permits the extraction, transport and further processing of bituminous oil. Owing to the relatively high bitumen content, the bituminous oil cannot be easily processed by traditional refinery methods.

At present, the bituminous oil emulsion is used to fire power stations. The high sulphur content in bituminous oils (from 3 to 4%) causes a correspondingly high level of environmental pollution, a level which is becoming more and more unacceptable in the industrialized countries. The alternative is to produce desulphurized fuel gas by partial oxidation, also referred to as gasification, of the bituminous oil, thus obtaining raw gas mainly consisting of CO and $H_2$. The raw gas is subsequently treated to obtain desulphurized fuel gas suitable for firing combined cycle power plants. The partial oxidation of bituminous oil is also suitable for the generation of synthesis gas or hydrogen, which can be used in a Fischer-Tropsch process or in processes for preparing a wide range of chemicals such as methanol, ammonia, oxy-products, formic acid and acetic acid.

EP-A-790292 describes a process in which an emulsion of Olinoco tar and water, also containing small amounts of sulfonic acid type surface active agent, having a starting temperature of 20 to 30° C. is broken by raising the temperature of the emulsion to 150° C. in two stages by means of an indirect heat exchange.

U.S. Pat. No. 5,441,548 also describes a process in which a bituminous oil/water emulsion is broken by raising the temperature of the emulsion to a temperature of between 130 and 170° C. by means of two heat exchangers in series. The water and bituminous oil phase are subsequently separated by means of phase separation in a gravity type emulsion separator. According to the specification no additional chemicals such as for example demulsifiers are added to improve the separation of the bituminous oil phase and the water phase.

A disadvantage of the above processes is that the starting emulsion still has, a relatively high viscosity at a temperature of below 100° C. when entering the first heat exchanger. Because of this high viscosity the heat exchanger must be equipped with large diameter tubes through which the emulsion flows and/or a high pressure must be applied to overcome the pressure drop in the first part of the heat exchanger where the viscosity is still high. Large diameter tubes are less effective resulting in that the heat exchanger will become large in order to perform the desired raise in temperature or, as is the case in U.S. Pat. No. 5,441,548, more than one heat exchanger will have to be used in series. The high pressure needed is disadvantageous because special pumps must be used. Furthermore the heat exchanger and the process equipment downstream of the heat exchanger, like for example the gravity-type emulsion separator, must be designed for this higher pressure level for obvious safety reasons. The present invention provides a process, which can be operated at a lower pressure having all the obvious advantages in view of the above.

The following process achieves this object. Process for separating an emulsion of a bituminous oil and water into a liquid water phase and a liquid bituminous oil phase, wherein the following steps are performed:
(a) raising the temperature of the bituminous oil/water emulsion having a temperature of below 100° C. to a temperature of above 140° C., and
(b) performing a phase separation wherein a liquid water phase and a liquid bituminous oil phase are obtained, wherein the heating of the emulsion in step (a) is effected by first mixing part of liquid bituminous oil phase obtained in step (b) having a temperature of above 140° C. with the bituminous oil/water emulsion and subsequently raising the temperature of the resulting mixture to a temperature of above 140° C. by making use of indirect heat exchange means.

It has been found that by mixing the emulsion feed with part of the bituminous oil phase obtained in the phase separation of the emulsion the temperature can be sufficiently raised in order to lower the viscosity of the mixture entering the heat exchanger means. This results in that a lower pressure drop in the heat exchanger has to be overcome enabling a lower inlet pressure. Accordingly smaller and more simple pumps, smaller heat exchanger means and process equipment designed for lower pressure levels can be used with the process according the invention.

Applicants have also found that the temperature at which step (b) is performed is important for an efficient process. Applicants found that for this oil-water system the water phase has a higher density than the oil phase at temperatures of below about 130° C. Above about 130° C. the oil phase has a higher density than the water phase. By increasing the temperature starting from about 130° C. the difference in density increases and thus the ease at which the phases separate in a heavy oil phase and a lighter water phase increases. At 140° C. a sufficient difference is achieved to perform a phase separation. Preferably the temperature is not higher than 200° C. because at higher temperatures the solvability of the oil in water and water in oil becomes undesirably high. A more preferred range is between 160–200° C. in which the difference in density is sufficiently high to achieve a efficient phase separation and the solvability is of water in oil and oil in water is within an acceptable range. Most preferably the temperature is between 160–180° C. The weight ratio of oil phase and emulsion which are mixed to achieve the first raise in temperature is preferably between 1 to 2 and 1 to 5.

Suitable indirect heat exchanger means to be used in the process according to the invention can be for example those means disclosed in U.S. Pat. No. 5,441,548. An example of a preferred heat exchanger means is a shell-tube heat exchanger, wherein a hot medium, like for example steam or hot oil, at the shell side exchanges its heat with the mixture comprising the emulsion present at the tube side. The temperature rise in the heat exchanger means is preferably from between 120–150° C. to a value between 160–180° C.

For some applications of the bituminous oil obtained by the process according to the invention it is advantageous to lower the level of water soluble salts in said oil. Examples of such salts are magnesium, calcium, sodium, potassium, containing salts. Such salts may cause severe fouling in for example the process equipment of a partial oxidation process. In for example the process disclosed in U.S. Pat. No. 5,441,548 the content of such water soluble salts in the bituminous oil phase will be too high for these applications. Applicants have now found that by lowering the pH of the water phase obtained in step (b) to a level of below 7 a lower content of these salts remain in the oil phase. The pH is preferably between 4 and 6. Preferably the pressure during phase separation is sufficiently high to ensure that the water phase is obtained as a liquid in step (b). Suitable pressures are between 5 and 20 bars. Obtaining the water phase as a liquid further ensures that most salts will be removed with the water phase. The improved removal of these water soluble salts by lowering the pH of the water phase is preferably used in combination with the process according to the invention. It must be appreciated that this technical measure can also be used in a more general manner and not only limited as an embodiment of the present invention in which the recycling of part of the oil is an essential feature. Typical emulsions which can be treated by the above preferred embodiment may have a calcium content of above 20 ppmw and/or a magnesium content of above 20 ppmw.

Typically the bituminous oil/water emulsion has a water phase with a pH of above 7 caused by the natural and/or the added surfactants present in the emulsion. In order to achieve the lower pH suitably an acid is added prior to phase separation. Examples of suitable acids which may be used are those acids which do not cause significant problems in the water treatment facilities in which the water phase is suitably further treated before being returned to surface water, like rivers, sea or lakes. Examples of such acids are sulphuric acid, phosphoric acid and acetic acid of which sulphuric acid is preferred because of its availability and ability to simply be removed from the water phase, for example as gypsum. The amount of acid added can be easily determined by measuring the pH of the water phase obtained in the process.

Phase separation can be performed in any conventional phase separation device known to one skilled in the art. These devices can be a gravity-type separator or a combination of a gravity separator and a down stream emulsion separator in the electrostatic field.

The bituminous oil can be the natural occurring crude petroleum sources found in the Orinoco Basin, in Trinidad, in North America, and in other areas, which are noted for their high bitumen content. The bituminous oil may also be the vacuum residue fraction obtained when refining a typical petroleum crude. Due to for example local environmental reasons it may happen that these fractions cannot be further processed to fuels. It may be desirable to transport these fractions to locations where they may be used as gasification feedstock. Due to their viscous properties these fractions will be suitably transported as a water/oil emulsion.

The bituminous oil/water emulsion may also comprise surfactants. Examples of possible surfactants are ethoxylated alkyl phenols, for example nonyl phenol ethoxylate compounds, ethoxylated alcohols, water soluble amine compounds, alkali compounds and combinations thereof. Examples of water soluble amines are ethylamine, diethylamine, triethylamine, n-butylamine, tri-isobutylamine, dimethylamine, methylamine, propylamine, dipropylamine, sec-propylamine, butylamine, sec-butylamine, ethanolamine and mixtures thereof. The ethoxylated alcohols may contains between 12–18 carbon atoms, for example polyethoxylated tridecanol. Examples of alkali compounds are sodium chloride, potassium chloride, sodium nitrate, potassium nitrate, calcium nitrate, magnesium nitrate and mixtures thereof. The emulsion typically comprises between 60–85% by weight of the bituminous oil, between 0.01 to 5% by weight of surfactant and between 10 to 40% by weight of water. Examples of bituminous oil water emulsions optionally comprising the exemplified surfactants, which can be used in the process according to the present invention are for example described in U.S. Pat. No. 5,419,852, U.S. Pat. No. 5,437,693, U.S. Pat. No. 5,480,583, U.S. Pat. No. 5,503,772, U.S. Pat. No. 5,556,574, U.S. Pat. No. 5,603,864 and U.S. Pat. No. 5,622,920. Preferred emulsion are ORIMULSION and OLIMULSION as for example described in U.S. Pat. No. 4,795,478 or EP-A-790292 respectively (ORIMULSION is a trademark of Intevep S.A. Venezuela) (OLIMULSION is a trademark of Bitumes Olinoco S.A. Venezuela).

The bituminous oil obtained in the above process can be advantageously be used as feedstock for a gasification process. The gasification process can be any process known in the art which is suitable for processing heavy-feedstocks like the above described bituminous oil. Examples of such processes are the SHELL Gasification Process as for example described by Heurich et al. in "Partial Oxidation in the Refinery Hydrogen Management Scheme", AIChE 1993 Spring Meeting, Houston, 30 Mar. 1993 and the TEXACO process as described in Petroleum Review Jun. 1990, page 311–314. Typically the bituminous oil and oxygen or air is fed to a gasification burner. Optionally a moderator gas, for example steam or carbon dioxide, may be supplied to the burner as well. At the burner outlet the reactants are atomised and mixed and an exothermic partial oxidation takes place at a temperature of between 1300 and 1500° C. The pressure is typically between 10 and 90 bar. The resulting fuel or synthesis gases will mainly consist of CO and $H_2$. Other components will be $CO_2$, $CH_4$, $H_2O$, $H_2S$, COS, $N_2$ and Ar. The hot fuel gases are subsequently lowered in temperature for example by means of a water quench or by means of indirect heat exchange. An example of such an indirect heat exchange method is described in EP-A-774103 and which describes a vertical oriented shell-tube heat exchanger in which the temperature is typically lowered from 1300–1500° C. to a temperature typically between 300 and 350° C. In such a device high pressure steam is generated at the shell side of the unit while the synthesis gases are lowered in temperature at the tube side of the heat exchanger. The advantages of the invention are even more achieved when the bituminous oil obtained by the present invention is used in a gasification process which applies such an indirect heat exchanger. This is because the water soluble salt in the feedstock, which salts are effectively removed by one preferred embodiment of the present invention, can cause severe plugging of the heat exchanger (tubes).

The invention will be illustrated by making use of FIG. 1. FIG. 1 describes a process for separating a bituminous oil/water emulsion and the gasification of the bituminous oil thus obtained. A bituminous oil/water emulsion (1) is mixed with a recycle stream of bituminous oil (8) resulting in stream (2). This mixture (2) is heated to the desired temperature in heat exchanger (3) resulting in heated stream (4) which is fed to the gravity phase separator (5). In gravity-type separator (5) a water phase (6) as the top phase and a heavier bituminous oil phase (7) as the bottom phase is obtained. Part of the bituminous phase (7) is recycled via pump (9) to heat exchanger (3) as stream (8) to which recycle stream some acid is supplied via stream (10) in order to lower the pH to the desired level. The remaining part (11)

of the bituminous oil phase (7) is fed to gasification unit (14). To this reactor unit comprising burners (not shown) also air or oxygen is fed via (12) and optionally a moderator gas is fed via (13). The fuel gas mixture obtained via (15) is lowered in temperature in a shell-tube heat exchanger (16) to which boiler feed water is supplied to via (17) and high pressure steam (18) is generated. Fuel gas mixture (19) obtained in heat exchanger (16) is further processed in downstream unit operations (not shown) in which for example ash and soot and sulphur containing compounds are removed.

The invention will be illustrated by the following non-limiting example.

EXAMPLE 1

785 ton/day of ORIMULSION having a temperature of 40° C. was contacted with 3140 ton/day of recirculating oil phase having a temperature of 170° C. at 15 bar resulting in a mixture having a temperature of 149.5° C. This mixture was further heated in a heat exchanger to a temperature of 170° C. having a viscosity of 179 cSt. Phase separation was performed resulting in 236 ton/day water and 3690 ton/day oil phase at 10 bar of which oil phase 3140 ton/day is used to heat the Orimulsion feed and 550 ton/day is obtained as oil product having a temperature of 170° C. and a viscosity of 102 cSt. The pressure of the circulating oil phase is raised from 10 bar to 15 bar by means of a pump. To this circulating mixture 63 kg/day of sulphuric acid is added.

EXAMPLE 2

To one weight part of a typical ORIMULSION (ORIMULSION is a trade name of Intevep S.A. describing an emulsion of a bituminous oil and water and their preparation is described in U.S. Pat. No. 4,795,478) an amount of sulphuric acid was added in order that the pH of the resulting water phase had a pH of 5 (80 mg sulphuric acid per kg of emulsion). The water content of the emulsion was 30% by weight. Phase separation was performed at a temperature of 180° C. and at a pressure of 10 bar. The phases remained in the liquid phase during phase separation. A water phase was obtained as the top phase. In Table 1 some more information of the ORIMULSION used and the resulting phase separation is presented.

EXAMPLE 3

Example 2 was repeated except that no acid was added. The pH of the resulting water phase was 7.9. See also Table 1.

TABLE 1

|  | Orimulsion | Example 2 Bituminous oil phase | Example 3 Bituminous oil phase |
|---|---|---|---|
| Calcium (ppmw) | 34 | 12 | 52 |
| Magnesium (ppmw) | 46 | 5 | 46 |
| oil in water phase after phase separation (wt %) | — | 0.1 | 0.3 |

What is claimed is:

1. Process for separating an emulsion of a bituminous oil and water into a liquid water phase and a liquid bituminous oil phase, wherein the following steps are performed:
   (a) raising the temperature of the bituminous oil/water emulsion having a temperature of below 100° C. to a temperature of above 140° C., and
   (b) performing a phase separation wherein a liquid water phase and a liquid bituminous oil phase are obtained, wherein the heating of the emulsion in step (a) is effected by first mixing part of liquid bituminous oil phase obtained in step (b) having a temperature of above 140° C. with the bituminous oil/water emulsion and subsequently raising the temperature of the resulting mixture to a temperature of about 140° C. by making use of indirect heat exchange means.

2. The process of claim 1, wherein in step (a) the temperature is raised to a value of between 140–200° C.

3. The process of claim 2, wherein in step (a) the temperature is raised to a value of between 160–200° C.

4. The process of claim 3, wherein the temperature of the resulting mixture is raised from a value of between 120–150° C. to a value of between 160–180° C. by making use of the indirect heat exchange means.

5. The process of claim 1, wherein the pressure in step (b) is sufficiently high in order to obtain both phases in the liquid state.

6. The process of claim 5, wherein in step (b) the liquid water phase has a pH of below 7.

7. The process of claim 6, wherein the pH of the liquid water phase is between 4 and 6.

8. The process of claim 1, wherein the starting emulsion has a water content of between 1–40% by weight, a surfactants content of between 0.01–5% by weight and an oil content of between 60–85% by weight, wherein the oil alone has a viscosity of above 305 Pa.s at 20° C.

9. The gasification process for preparing synthesis gas, wherein a liquid bituminous oil is obtained according to the process of claim 1 and wherein said liquid bituminous oil, having a temperature of above 140° C., is fed to a gasification unit in which synthesis gas is obtained.

10. A process as recited in claim 9, further comprising:
   feeding liquid bituminous oil obtained from said performing step (b) to a gasification burner means with oxygen whereby a partial oxidation takes place to form a hot synthesis gas comprising carbon monoxide and hydrogen.

11. A method as recited in claim 10, further comprising:
   lowering the temperature of said hot synthesis gas.

12. A method as recited in claim 11, wherein said hot synthesis gas is at a temperature between 1300° C. to 1500° C. and the lowered temperature of said hot synthesis gas is between 300 to 350° C.

13. A method as recited in claim 12, wherein the lowering of said hot synthesis gas is done by indirect heat exchange means.

14. A process for separating an emulsion comprising bituminous oil and water into a liquid water phase and a liquid bituminous phase, wherein said process comprises:
   mixing a part of an oil phase with said emulsion having an emulsion temperature to yield a mixture having a mixture temperature;
   raising said mixture temperature of said mixture to thereby provide a heated stream having a desired temperature; and
   performing a phase separation of said heated stream to obtain a water phase having a water phase pH and said oil phase.

15. A process as recited in claim 14, further comprising:
   adding an amount of an acid to said emulsion prior to said step for performing said phase separation to thereby lower said water phase pH to a desired water phase pH.

16. A process as recited in claim 15, further comprising:
measuring said water phase pH and therefrom determining said amount of said acid to be added to said emulsion by said adding step to provide said desired water phase pH.

17. A process as recited in claim 16, wherein said acid is selected from the group consisting of sulfuric acid, phosphoric acid, and acetic acid.

18. A process as recited in claim 17, wherein said emulsion further comprises a concentration of a water soluble salt selected from the group consisting of salts of magnesium, calcium, sodium, and potassium.

19. A process as recited in claim 18, wherein said emulsion further comprises a calcium content above 20 ppmw.

20. A process as recited in claim 19, wherein said emulsion further comprises a magnesium content above 20 ppmw.

21. A process as recited in claim 20, wherein said emulsion temperature is below 100° C.

22. A process as recited in claim 21, wherein said desired temperature is above 140° C.

23. A process as recited in claim 22, wherein said water phase pH is above 7 and said desired water phase pH is below 7.

24. A process as recited in claim 23, wherein said desired water phase pH is in the range of from 4 to 6.

25. A process as recited in claim 24, wherein said desired temperature is in the range of from 160 to 200° C.

26. A process as recited in claim 25, wherein said emulsion further comprises between 60 to 85 weight percent said bituminous oil, between 10 to 40 weight percent said water, and between 0.01 to 5 weight percent surfactant.

27. A process as recited in claim 26, further comprising:
feeding a remaining part of said oil phase to gasification burner means with oxygen whereby a partial oxidation takes place to form a hot synthesis gas comprising carbon monoxide and hydrogen.

28. A process as recited in claim 27, further comprising:
lowering the temperature of said hot synthesis gas.

29. A process as recited in claim 28, wherein said hot synthesis gas is at a temperature between 1300° C. to 1500° C. and the lowered temperature of said hot synthesis gas is between 300 to 350° C.

30. A process as recited in claim 29, wherein the lowering of said hot synthesis gas is done by indirect heat exchange means.

31. A process as recited in claim 15, wherein said acid is selected from the group consisting of sulfuric acid, phosphoric acid, and acetic acid.

32. A process as recited in claim 31, wherein said emulsion further comprises a concentration of a water soluble salt selected from the group consisting of salts of magnesium, calcium, sodium, and potassium, wherein the calcium content is above 20 ppmw and the magnesium content is above 20 ppmw.

33. A process as recited in claim 32, wherein said emulsion temperature is below 100° C. and said desired temperature is above 140° C.

34. A process as recited in claim 33, wherein said water phase pH is above 7 and said desired water phase pH is below 7.

35. A process as recited in claim 34, wherein said desired water phase pH is the range of from 4 to 6.

* * * * *